A. WARTH.

CLOTH-CUTTING-MACHINE.

No. 7,304. Reissued Sept. 5, 1876.

Witnesses. Otto Schifeland. Robt E. Miller

Inventor. Albin Warth by Van Santvoord & Hauff his Attorneys.

N. PETERS, PHOTO-LITHOGRAPHER, WASHINGTON, D. C.

UNITED STATES PATENT OFFICE.

ALBIN WARTH, OF STAPLETON, NEW YORK.

IMPROVEMENT IN CLOTH-CUTTING MACHINES.

Specification forming part of Letters Patent No. 130,344, dated August 6, 1872; reissue No. 7,304, dated September 5, 1876; application filed July 10, 1876.

*To all whom it may concern:*

Be it known that I, ALBIN WARTH, of Stapleton, in the county of Richmond and State of New York, have invented a new and useful Improvement in Machines for Cutting Textile and other Materials, which improvement is fully set forth in the following specification, reference being had to the accompanying drawing, in which—

Figure 1:
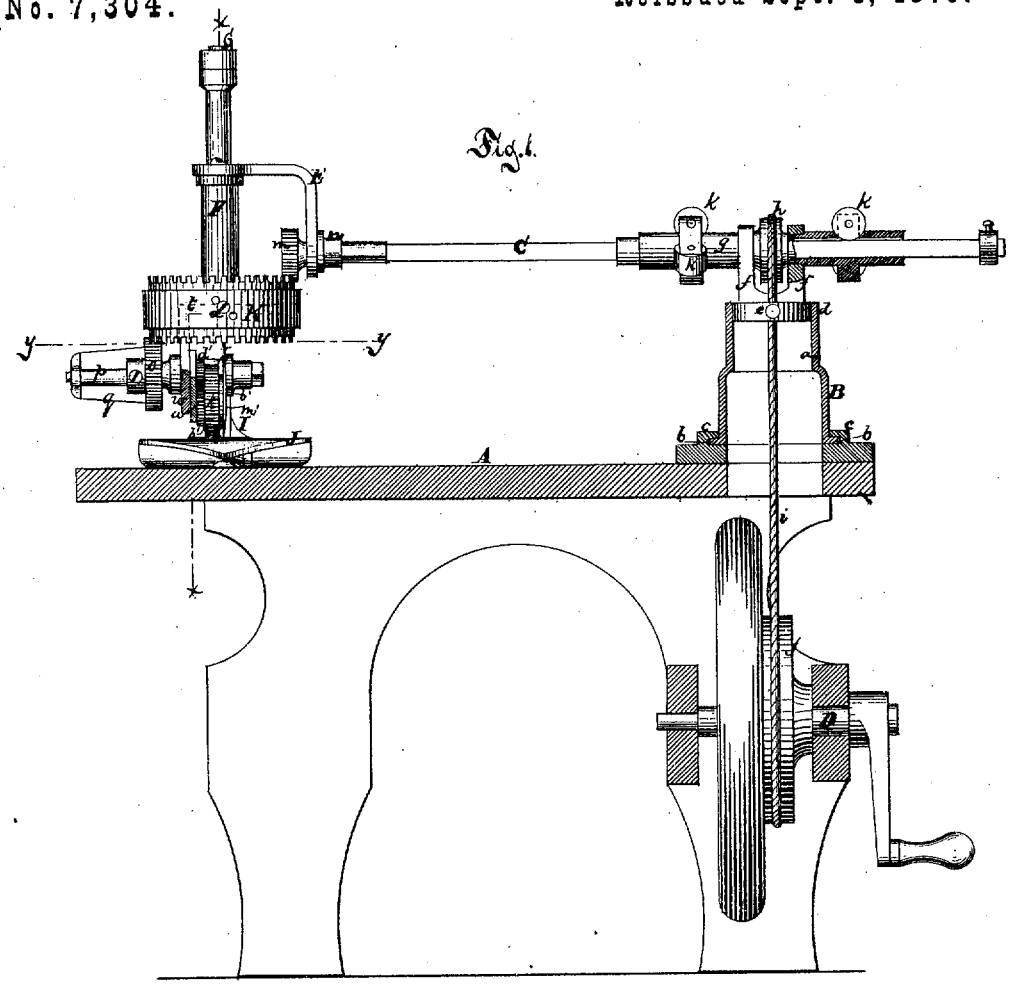
Figure 2:
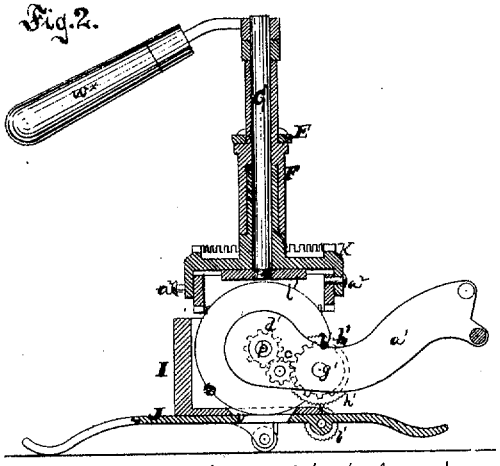
Figure 3:
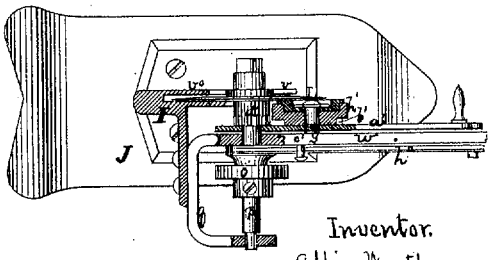

Figure 1 represents a sectional side view. Fig. 2 is a vertical section of the cutting mechanism in the plane *x x*, Fig. 1. Fig. 3 is a horizontal section of the same in the plane *y y*, Fig. 1.

Similar letters indicate corresponding parts.

This invention consists in the combination of a cutting mechanism, consisting of a knife and a throat-plate containing a knife-receiving socket, with a rod, which is free to swing in a vertical, and also in a horizontal, plane, and with a cutting-table, for the purpose of facilitating the motions of the cutting mechanism over the table; also, in the combination, with a rotating knife, and with a throat-plate containing a knife-receiving socket, of a rod, which has a sliding, a swinging, and a revolving motion, and is geared together with the revolving knife, so that the cutting mechanism can be freely moved in any desired direction without being thrown out of gear with the driving-shaft; further, in the combination, with a rotating knife, and with the mechanism for transmitting motion to and for guiding said knife, of a standard, which forms the bearings for the shaft of the rotating knife, and also for the shaft, through which motion is transmitted to said knife, whereby the operation of guiding the knife is materially facilitated; also, in the combination of a sectional double cog-wheel with the throat-plate, the rotating knife, and the mechanism for transmitting motion to and for guiding said knife, so that said cog-wheel can be readily adjusted to knives of different diameters, and that when the knife wears off, and has to be moved toward the throat-plate, the cog-wheel can be adjusted accordingly; further, in the combination, with the rotating knife, the throat-plate, and the mechanism for transmitting motion to and for guiding said knife, of an automatic feed-receiving motion from the spindle of the rotating knife, so that the material to be cut can be fed automatically toward the rotating knife; also, in the combination, with the rotating knife, and with the mechanism for imparting motion to and for guiding the same, of a sharpening device mounted on an arbor, which is geared together with said knife, so that, as the knife revolves, its cutting-edge is continually kept sharp, and at the same time, by the motion of the sharpening device, a constantly-varying surface of said device is presented to the knife; further, in the combination, with the rotating knife, of a standard, which projects beyond both sides of said knife, and which follows in the cut opened by the knife, so as to spread the cut material and prevent the same from crowding against the sides of the knife; further, in the combination, with the shaft which carries the rotating knife, and with the wheel K, which imparts motion to said knife-shafts, of a handle, situated in advance of or on one and the same side of both the knife and the wheel, which imparts motion to the knife-shaft, so that the hand which guides the cutting mechanism can be freely turned in either direction without coming in contact with any part of the machine.

In the drawing, the letter A designates a table, from which rises the swivel-head B which supports the rod C. Said swivel-head consists of a tubular standard, *a*, which is provided with a bottom flange, *b*, to fit into a grooved bracket, *c*, which is firmly secured to the table A, the tubular standard being free to rotate in said bracket. In the mouth of the tubular standard is fitted a plate, *d*, which swings between center-points *e*, and from which rise two standards, *f*, that form the bearings for a tubular shaft, *g*. This shaft is bored out to receive the rod C, which is, by preference, made triangular, but which may be formed in any desirable manner, so that it will not turn in the tubular shaft, while it is free to slide therein. By means of the center-points *e* said rod, together with the tubular shaft, can be swung up or down or brought in any desired inclination toward the table A, while the tubular standard *a* allows the same to turn freely in either direction in a plane parallel to the surface of the table.

On the tubular shaft $g$ is mounted a pulley, $h$, which connects, by a belt, $i$, with a pulley, $j$, mounted on the driving-shaft D, that has its bearings in boxes secured to one of the legs of the table A, and which receives motion by a hand-crank, or by a treadle, or by any other suitable means. The sliding motion of the rod C in the tubular shaft is facilitated by friction-rollers $k$, which project through the sides of said tubular shaft, and bear from different sides against the rod C. One end of this rod is turned off round, and it has its bearing in a bracket, E, which extends from a sleeve, F, fitted on a cylindrical arbor, G. This arbor is supported by a standard, I, which rises from the throat-plate J, said standard being provided with a flange, $l$, (shown in Fig. 2 in section, and in Fig. 1 in dotted lines,) in which the arbor G is firmly secured. On the flange $l$ rests a double cog-wheel, K, which is dropped loosely on the arbor G beneath the sleeve F, said sleeve being bored out to receive the tubular hub of the cog-wheel. Said cog-wheel is provided with teeth on its upper and also on its lower surface, and it is made in two sections, which fit into each other like telescope tubes, so that by drawing out the inner section the distance between the upper and the lower set of cogs can be increased, and vice versa. The two sections of the cog-wheel K are secured in the required position by set-screws $a^2$. The upper cogs of said cog-wheel gear into a pinion, $m$, mounted on the end of the rod C, inside of the bracket E, said rod being prevented from sliding in the bracket by the pinion on one, and by a screw-ring, $n$, on the other side of the same. The lower set of cogs of the wheel K gear into a pinion, $o$, which is mounted on a shaft, $p$, that has its bearings in a bracket, $q$, extending from or forming a part of the standard I of the throat-plate. On this shaft is also secured the circular disk-knife L, and as the sliding rod C is revolved, a rotary motion is imparted to the disk-knife. The cutting-edge of this knife co-operates with a cutting-edge formed on the side of the throat $v$ in the throat-plate J. From the bracket $q$, which supports the shaft $p$, extends an arm, $w$, Fig. 3, which may serve as the handle for guiding the mechanism during the operation of cutting; or, if desired, an additional handle, $w^*$, may be adjustably secured to the upper end of the rod G. (See Fig. 2.) Said handle is so arranged that it may be set in such manner that when grasped by the hand the hand may be situated in advance of or on the same side of the knife and the wheel, imparting motion to the same.

In some machines of this class the handle which guides the knife is placed between the knife and the wheel, which imparts motion to the knife-shaft, and thereby the operation of guiding the knife is rendered extremely difficult, because, in turning the same, the hand comes in contact with that portion of the mechanism which contains the wheel, imparting motion to the knife-shaft.

On one side of the arm $w$ is placed a lever, $a^1$, which has its fulcrum on the shaft or spindle $p$, and in which is secured a pin, $g'$, that forms the bearing for the feed-wheel $h'$. On the inside of this feed-wheel is fastened a cog-wheel, $b'$, which is geared by an intermediate pinion, $c'$, with another pinion, $d'$, mounted on the spindle $p$, so that said feed-wheel receives a continuous revolving motion in the same direction with said spindle. A spring, $h^\circ$, which acts on the lever $a^1$, serves to depress the feed-wheel toward a serrated wheel, $l'$, which is mounted in the throat-plate. As the spindle $p$ revolves, a constant rotary motion is imparted to the feed-wheel $h'$, and if the material to be cut is placed beneath the feed-wheel and held stationary, the cutting mechanism is fed automatically toward said material, the throat-plate J being placed beneath it, so that by the co-operation of the cutting-edges of the revolving knife and of the throat-plate the cutting is effected.

The throat-plate may be constructed with one or more caster-rollers on its bottom surface, so that it will move easily on the table A, and it may be curved, as shown in Fig. 2; or it may be made in the shape of a flat plate, either oblong or in any desirable form. If desired, the feed mechanism may be dispensed with, and the cutting mechanism may be directed entirely by the action of the workman, who can move the same in any desired direction, as the formation of the pattern may require, so as to cause the knife to follow the contours of the pattern. The standard I is provided with a recess, $v^\circ$, into which the knife extends, (see Fig. 3,) and since said standard projects beyond both sides of the knife, and as the same follows the knife in the cut, it prevents the material from crowding against the sides of the knife during the operation of cutting. In the side of the wheel $h'$, which is geared together with the disk-knife, is secured a sharpening device, $m'$, which bears against the side of the disk-knife, and serves to keep its cutting-edge sharp. As the sharpening device revolves with the wheel $h'$ it presents a constantly-varying surface to the knife. When the cutting-edge of the knife wears away the bracket $q$, which forms the bearings for the spindle $p$, may be lowered, and the cog-wheel K is extended to make up for the difference.

It will be noticed from this description that the bearings of the wheel K, which transmits motion to the disk-knife, as well as the bearings of the shaft, which carries the knife, are on or in parts which form parts of or are firmly connected to the standard I. By this arrangement I am enabled to place the rotating knife directly beneath the center of motion of the wheel K, and if the knife is turned by the handle $w$ or $w^*$ it turns round a vertical line drawn through its center and the center of the wheel K, and it works with the greatest possible ease in the material to be cut. And by arranging the rod C so that the same is free to swing in a vertical as well as in a horizontal plane, the cutting mechanism can be freely moved over the table and raised, so as to clear articles which may lie on said table.

What I claim as new, and desire to secure by Letters Patent, is—

1. The combination of a cutting-machine, consisting of a knife and a throat-plate containing a knife-receiving socket, with a rod which is free to swing in a vertical, and also in a horizontal, plane, and with a table, over which the cutting mechanism is to be moved, substantially as and for the purpose set forth.

2. The combination, with a rotating knife, and with a throat-plate containing a knife-receiving socket, of a rod, which has a sliding, a swinging, and a revolving motion, and is geared together with the revolving knife, substantially as and for the purpose described.

3. The combination, with a rotating traversing knife, and with the mechanism for transmitting motion to, and for guiding, said knife, of a standard which forms the bearings for the shaft of the rotating knife, and also for the shaft through which motion is transmitted to said knife, substantially as and for the purpose shown and described.

4. The combination of a sectional double cog-wheel with the throat-plate, the rotationg knife, and the mechanism for transmitting motion to, and for guiding, said knife, substantially as and for the purpose set forth.

5. The combination, with the rotating knife, the throat-plate, and the mechanism for transmitting motion to, and for guiding, said knife, of an automatic feed-receiving motion from the spindle of the rotating knife, substantially as and for the purpose shown and described.

6. The combination, with the rotating knife, and with the mechanism for imparting motion to, and for guiding, the same, of a sharpening device mounted on an arbor, which is geared together with said knife, substantially as and for the purpose set forth.

7. The combination, with the rotating knife, of a standard, which projects beyond both sides of said knife, and which follows in the cut opened by the same, so as to spread the cut material and prevent it from crowding against the sides of the knife, substantially as shown and described.

8. The combination, with the shaft which carries the rotating knife, and with the wheel which imparts motion to said knife-shaft, of a handle, situated in advance, or on one and the same side, of both the knife and the wheel, substantially as and for the purpose set forth.

In testimony that I claim the foregoing I have hereunto set my hand and seal this 26th day of June, 1876.

ALBIN WARTH. [L. S.]

Witnesses:

W. HAUFF,

E. F. KASTENHUBER.